Patented Apr. 24, 1951

2,549,765

UNITED STATES PATENT OFFICE 2,549,765

PROCESS FOR PRODUCTION OF LOWER ALIPHATIC ACIDS BY FERMENTATION

Samuel C. Beesch and David A. Legg, Philadelphia, Pa., assignors to Publicker Industries Inc., Philadelphia, Pa., a corporation of Pennsylvania No Drawing. Application March 8, 1947, Serial No. 733,438

9 Claims. (Cl. 195—47)

Our invention relates to the production of lower aliphatic acids by biochemical methods. More particularly it is concerned with the production of acetic, propionic and butyric acids by fermenting a suitable carbohydrate mash with a new species of bacteria.

It has previously been known that fermentable carbohydrate mashes such as, for example, those employing suitable monosaccharides, could be fermented by means of certain bacteria to produce mixtures of acetic, propionic and butyric acids, and in some instances it has been found with mono-and/or polysaccharide containing mashes that substantially the entire quantity of fermentation products obtained consisted of butyric acid. However, the particular sugar fermenting bacteria employed up to the present time have had certain disadvantages. Thus, for example, they require a relatively long fermentation period, usually in the neighborhood of ninety-six hours and give relatively low yields of mixed acids. In addition, such bacteria, as heretofore employed, which produce said mixed acids, are incapable of fermenting polysaccharides to any appreciable extent and are sensitive to iron and other similar metals so that fermentation operations cannot be carried out in the usual type of iron or similar metal fermenters.

We have now found that by using a novel process employing a new type of bacteria, we are able to produce mixed acids of the above mentioned class by fermentation with greatly superior economic advantages. Thus, we have found that, using the process of the present invention, it is possible to complete the involved fermentation in from about one-half to two-thirds of the fermentation period previously required, and at the same time, to obtain an unusually large quantity of mixed acids in proportion to the total amount of available sugar present. We have further found that the new type of bacteria discovered by us is not harmfully affected, to any appreciable extent, by iron or similar metals so that the process of the present invention can be readily effected in conventional iron fermenters. We have also discovered that these new bacteria are capable of fermenting polysaccharides and monosaccharides so that the process of our invention can be effected equally well with mashes consisting essentially of polysaccharides and/or monosaccharides as the fermentable carbohydrate.

The bacteria of the present invention may be described and readily distinguished from other bacteria by means of appropriate characteristics of the descriptive chart of the Society of American Bacteriologists, and other distinguishing characteristics:

Name of organism: Clostridium saccharo-aceto-propionic butyricum.
Source: Soil
I. Morphology
  1. Vegetative cells
    Medium used: Potato glucose medium. (300 gms. Idaho potato moist weight, 10 gms. of glucose, 1 gm. ammonium sulfate, 3 gms. calcium carbonate per liter)
    Incubation: 30 hrs. at 30° C.
    Stain used: Nigrosin without heat
    Form: Short and long rods
    Arrangement: Single and in chains
    Usual limits of length: 3.5 to 17.5 microns
    Of diameter: 0.3 to 4.0 microns
    Size of majority: 1.6 by 6.0 microns
    Ends: Rounded
  2. Sporangia: Present
    Medium used: Potato glucose medium
    Incubation: 32 hours at 30° C.
    Stain used: Nigrosin without heat
    Form: Spindled and clavate
  3. Endospores:
    Medium used: Potato glucose medium
    Incubation: 72 hrs. at 30° C.
    Stain used: Negative nigrosin without heat
    Location of endospores: Terminal to subterminal
    Form: Oval to round
    Usual limits of length: 0.7 to 3.0 microns
    Of diameter: 0.4 to 2.7 microns
    Size of majority: 1.1 by 2.1 microns
  4. Motility
    Medium used: Glucose broth. (5 gm. peptone, 3 gm. beef extract, 10 gm. glucose per liter)
    Incubation: 24 hrs. at 30° C.
    Motility: Motile
    Medium used: Nutrient agar. (Agar, 17 gms., glucose 20 gms., molasses 8 gms., peptone 5 gms., beef extract 3 gms. ammonium sulfate 1 gm. per liter)
    Incubation: 40 hrs. at 30° C.
    Motility: Motile
  5. Flagella:
    Medium used: Molasses mash. (40 gms. sugar calculated on invert molasses, ammonium sulfate 2.2 gms., calcium carbonate 2.4 gms., calcium acid phosphate .13 gm. per liter)
    Incubation: 20 hrs. at 30° C.
    Stain used: Loeffler's flagella stain
    Attachment: Peritrichous
  6. Irregular forms: Present
    Medium used: Potato glucose medium
    Incubation: 72 hrs. at 30° C.
  7. Staining reactions:
    (a) Gram stain
      Medium used: Potato glucose medium
      Incubation: 30° C. for 20 hrs.
      Stain used: Kopeloff Beerman modification
      Stain: Positive—variable
    (b) Iodine stain:
      Medium used: Nutrient agar
      Incubation: 48 hrs. at 30° C.
      Granulose: Positive
II. Cultural characteristics
  1. Agar colonies
    Medium used: Nutrient agar
    Incubation: 48 hrs. at 30° C.
    Form: Circular
    Surface: Smooth, glistening
    Edge: Entire
    Elevation: Very slightly raised
    Optical character: Opaque centers, transparent, watery
  2. Agar stroke
    Medium Used: Nutrient agar
    Incubation: 96 hrs. at 30° C.
    Growth: Present
    Form: Spreading
    Luster: Glistening
    Chromogenesis: None to light white
    Odor: Butyric
    Consistency: Butyrous
    Change in color of medium: None
  3. Nutrient broth
    Medium: Nutrient broth
    Incubation: 72 hrs. at 30° C.
    Surface growth: None
    Clouding: Slight to moderate
    Odor: Butyric
  4. Production of indole
    Medium used: Glucose tryptophane (glucose 2.5 gms., tryptophane 1.0 gm. per liter)
    Incubation: 96 hrs. at 30° C.
    Test used: p-Dimethyl amino benzaldehyde
    Indole: Absent II. Cultural characteristics—Continued
 5. Production of hydrogen sulphide
  Medium used: Lead acetate agar (agar 15 gms. Bacto tryptone 20 gms., glucose 10 gms., lead acetate 0.2 gm., per liter)
  Incubation: 72 hrs. at 30° C.
  Hydrogen sulphide: Absent or present in traces
 6. Relation to oxygen
  (a) Medium used: Nutrient agar
   Incubation: 48 hrs. at 30° C.
   Growth: (Aerobic incubation) absent
   Growth anaerobic incubation: Abundant
  (b) Medium used: Potato glucose medium
   Incubation: 24 hrs. at 30 °C.
   Growth: (Aerobic incubation) abundant
   Growth: (Anaerobic incubation) abundant
 7. Litmus milk
  Incubation: 30° C.
  Reaction: (3 days) acid
  Curd: (3 days) none
  Peptonization (15 days): None
  Reduction of litmus: (1 day) complete
 8. Gelatin stab
  Medium used: Nutrient gelatin (gelatin 120 gms., glucose 10 gms., peptone 5 gms., Beef extract 3 gms., per liter
  Incubation: 30° C.
  Growth: Best below surface to bottom
  Line of puncture: None
  Liquefaction: None in 3 or 30 days
  Change in color of medium: None
 9. Potato stroke
  Medium: Sterilized potato slant
  Incubation: 96 hrs. at 30° C.
  Growth: (Anaerobic) abundant
  Form: Spreading
  Luster: Glistening
  Chromogenesis: None to light cream
  Odor: None to butyric
  Consistency: Mucid and watery
  Change in Medium: None
III. Physiological characteristics
 1. Temperature relations
  Optimum fermentation temperature: 28-35° C.
 2. Relation to reaction of medium
  Optimum final pH: 5.0-7.0
 3. Chromogenesis
  Nutrient agar—Cream to light white
  Nutrient gelatin—None
  Potato—None to light cream
 4. Nitrate reduction
  Medium: 8% potato, 1% glucose, 0.1% $KNO_3$
  Incubation: 1-4 days
  Test used: α-Naphthylamine sulfanilic acid
  Reduction: None
 5. Fermentation reactions
  (a) Acid and gas production
   Medium used: Nutrient broth +10 gms. carbohydrate or alcohol to be tested per liter
  (b) Molasses fermentation
   Medium used: Cuban molasses blackstrap, 6.5% sugar, 33 gms. of calcium carbonate and 2 gms. ammonium carbonate per liter
   Yield range on sugar: 45-55%
   Average yield on sugar: 47%
   N-butyric acid: 50-65%
   Propionic acid: 2-10%
   Acetic acid: 20-50%
   Typical ratio:
    N-butyric acid, 55%; propionic, 4%; acetic, 41%

| Carbohydrate or alcohol | 72 hrs. Acid Production | 72 hrs. Gas Production |
|---|---|---|
| Esculin | − | − |
| Trehalose | + | − |
| Arabinose | − | − |
| Rhamnose | − | − |
| Xylose | − | − |
| Glucose | + | + |
| Fructose | + | + |
| Galactose | + | + |
| Mannose | + | + |
| Lactose | − | − |
| Sucrose | + | + |
| Maltose | + | + |
| Raffinose | + | + |
| Melizitose | − | − |
| Corn Starch | − | − |
| Soluble Starch | − | − |
| Inulin | + | + |
| Dextrin | − | − |
| Glycogen | − | − |
| Glycerol | − | − |
| Erythritol | − | − |
| Mannitol | + | + |
| Sorbitol | + | − |
| Dulcitol | − | − |
| Salicin | − | − |
| Alpha-methyl glucoside | + | + |
| Inositol | − | − |
| Melibiose | + | + |

−Negative; + moderate

The principal and outstanding characteristic of the bacteria employed in the process of our invention from a commercial point of view lies in their ability to produce consistently high yields, i. e., 45–55%, based on sugar, of the above mentioned lower aliphatic acids from mashes containing from about 65 to 75 grams of fermentable sugar per liter within a relatively short fermentation period as opposed to substantially longer fermentation periods to produce only butyric acid in yields of not more than 46–47% when employing similar mashes and previously known bacteria. In determining this characteristic a mash should be utilized which contains the necessary nutrients for the bacteria and the mash should be maintained under optimum temperature and pH conditions throughout the fermentation period. A healthy active culture of bacteria should be employed and the usual precautions should be taken as to sterilizing the mash, avoiding contamination, and the like.

While certain of the characteristics of the bacteria utilized in the present invention have been generally set forth above, it is to be understood that considerable variations may be expected if these conditions are appreciably changed. Changes in the molasses and nutrients supplied in the molasses, the addition of grain ethyl slop, and changes in temperature, etc., will cause a variation in the yield and ratio of products produced.

The bacteria employed in the present invention have certain requirements in regard to nutrients and conditions which must be satisfied to secure optimum yields in the fermentation. For example, the nitrogen requirements of these bacteria are in general satisfactorily fulfilled by the use of mono-ammonium phosphate. However, other common nitrogen nutrients may be utilized such as ammonium sulphate, degraded proteins such as polypeptides, amino acids, etc., and the final degradation product, ammonia and its salts. Also, mixtures of ammonia or salts thereof together with a higher form of nitrogenous material such as yeast water, steep water, distillation slop, or the like may be used. These bacteria likewise require phosphate nutrients as is true in the case of most bacteria. Many natural sources of carbohydrates such as molasses, and in particular black-strap molasses, contain sufficient phosphates, but in case of a deficiency, this may be supplied in the form of calcium acid phosphate or, preferably, in the form of ammonium phosphate which also simultaneously supplies the necessary nitrogen.

The concentration of nitrogenous and mineral nutrients to be incorporated in the mash will in general depend to a certain extent on the type of material employed as the carbohydrate source. The particular optimum amount for any type of mash can readily be determined by simple preliminary experiments. However, it may be said that in general from about 4 to 6.5 or 7% of mono-ammonium phosphate, or its equivalent, and preferably around 5.5%, based on the weight of the carbohydrate in the mash, and from 0.2% to 0.6%, and preferably about 0.3% of a superphosphate or its equivalent should be utilized in mashes prepared from high test molasses or other carbohydrate material low in nutrient content. Smaller amounts may, of course, be employed in the case of other raw materials which naturally contain greater amounts of nitrogen and mineral nutrients.

The bacteria employed in the process of our invention have an optimum pH within the range of 5.0 to 5.9. It should be understood, of course, that this is merely an optimum range and that high yields are obtainable with a much wider range of pH. It is preferred to control the acidity of the mash during the fermentation, however, in a manner such that the upper limit of the pH range does not exceed 7.0, while the lower limit should not generally fall substantially below 5.0. Control of the hydrogen ion concentration to secure a pH value which lies within the aforementioned range, may be achieved by supplying to the mash a suitable neutralizing agent such as calcium carbonate or any of several other suitable non-toxic neutralizing agents whose cations form a substantially insoluble salt with acetic, propionic, and butyric acids. Such neutralizing agents may be supplied throughout the fermentation either by starting with the desired entire quantity, by continuous addition, or semi-continuous addition thereof. Such neutralizing agents should generally be incorporated in the mash in an amount corresponding to approximately 50% of the weight of the carbohydrate in the mash, in excess of that required to initially achieve the desired pH value. During the fermentation it is highly desirable to keep the neutralizing agent in solution by gentle agitation of the mash thereby tending to neutralize the acids substantially as soon as they are formed. However, too violent agitation will generally interfere with the reproduction of the bacteria and consequently will tend to lower the yield of acids produced. The quantity of neutralizing agent employed may, in general, be said to be determined by the pH range considered to be desirable. These conditions may be readily determined for a given mash by simple preliminary experiments.

In general the temperature utilized in effecting fermentation in accordance with the present invention may vary between about 28 and 35° C. However, in the majority of instances it will ordinarily be found that the optimum fermentation temperature is around 30–32° C.

When the fermentation period has been completed, and all of the free acid present in the mash has been removed from solution by precipitation, the resulting neutral, or slightly alkaline mash is evaporated down to about one-third to one-fourth its original volume, preferably under vacuum. Sulfuric acid, or other suitable mineral acid, is then added to the resulting residue to liberate the fatty acids present. Thereafter this mixture is subjected to steam distillation whereby the aliphatic acids are obtained in the form of a dilute aqueous mixture. This aqueous mixture of acids may then be further concentrated and the respective acids recovered therefrom in accordance with known methods.

It is to be understood, of course, that in employing the bacteria of the present invention, the usual precautions employed by those skilled in the art in processes of this nature should be observed. For optimum results the final fermentation mash should be inoculated with a suitable concentration, i. e., about 6% by volume, of an actively fermenting culture, preferably from twenty to twenty-four hours old. The inoculant developed for this purpose should preferably be at the height of its activity at the time of inoculation. Similarly, the mashes utilized in the fermentation process should not be heated for unduly long periods during the sterilization, or sterilized at unduly high temperatures in view of the possible adverse effect of such procedures on the yields obtained. The usual precautions as to avoidance of contamination will insure continued operation with satisfactory results, although the bacteria of the present invention may be employed for the fermentation of unsterilized mashes if proper precautions in regard to cleanliness are taken and an unusually high concentration of contaminating organisms does not build up in any part of the fermentation apparatus.

The bacteria utilized in the process of our invention are available and may be isolated from natural sources in accordance with known procedures of isolation. For instance, cultures have been isolated from various soils, leguminous roots, rotted wood, corn stalks, and the like. Isolation procedures commonly used in the past for essentially sugar fermenting butyl alcohol and aliphatic acid producing bacteria such as enrichment culturing in favorable media, plating on solid media, picking single cells with micropipettes, or combinations of these procedures may be successfully employed for securing cultures of the present type of bacteria and cultures thus obtained may then be tested for their identifying properties in accordance with the procedures suggested above.

The present invention may be further illustrated by the following specific examples:

Example I

A mash containing 65 grams of sugar, calculated as sucrose, in the form of Cuban invert molasses, 33 grams of finely divided calcium carbonate, and 3.33 grams of mono-ammonium phosphate per liter of mash, was inoculated with 6% by volume of an active twenty-four culture of Clostridium saccharo-aceto-propionic butyricum and allowed to ferment for three days at 30° C. Upon completion, the fermentation yielded 37.6 grams of volatile acids per liter of mash calculated as butyric acid. The yield of volatile acids calculated on the basis of the sugar present was 54.1%. The ratio of volatile acids produced was as follows: butyric acid 43.0%, propionic acid 12%, and acetic acid 45%. On the basis of one gallon of invert molasses (75% invert sugar) a yield of 6.49 lbs. of mixed acids was obtained, calculated as butyric acid.

Example II

A sterilized molasses mash containing 65 grams of sugar, calculated as sucrose, in the form of Cuban blackstrap molasses, 33 grams of finely divided calcium carbonate, and 3.33 grams of mono-ammonium phosphate per liter was inoculated with 6% by volume of a twenty hour culture of Clostridium saccharo aceto propionic butyricum and allowed to ferment for three days at 30° C. Upon completion, the fermentation yielded 37.8 grams of volatile acids per liter of mash, calculated as butyric acid. The yield of volatile acids calculated on the basis of the sugar present was 54.3%. The composition of the mixture of volatile acids produced was as follows: butyric acid 50%, propionic acid 2%, and acetic acid 48%.

Example III

A sterilized Cuban invert molasses mash containing 65 grams of sugar, calculated as sucrose, 0.19 gram of phosphorous pentoxide supplied as calcium superphosphate, and 33 grams of finely divided calcium carbonate per liter was inoculated with 6% by volume of a twenty-four hour culture of Clostridium saccharo aceto propionic butyricum and allowed to ferment for forty-five hours at 30° C. Upon completion, the fermentation was found to yield 38.3 grams of volatile acids per liter, calculated as butyric acid. The yield of volatile acids calculated on the basis of the sugar present was 55.0%. The composition of the mixture of acids thus produced was as follows: butyric acid 46%, propionic acid 7%, and acetic acid 47%.

It will be noted from the above examples that satisfactory yields of lower aliphatic acids may be obtained from various types of mashes with the bacteria of the present invention utilizing, in general, higher sugar concentration mashes and shorter fermentation periods than can be employed with previously known bacteria. With the bacteria employed in the present invention the fermentation can usually be completed in at least seventy-two hours and with mashes of the general type set forth in Example III, fermentation periods substantially less than seventy-two hours can be achieved. Also, it should be pointed out that while the organisms of the present invention seem to function most efficiently with mashes having sugar concentrations of from 65 to 75 grams per liter, satisfactory fermentations can be effected with mashes containing sugar concentrations substantially in excess of 75 grams per liter. It is therefore to be understood that the present invention is not to be interpreted as limited to fermenation mashes of any particular sugar concentration, although the bacteria may be identified by their ability to produce relatively high yields of mixed lower aliphatic acids from mashes containing from 65 to 75 grams of sugar per liter.

It is also to be understood, of course, that the examples given above are illustrative only and that our invention is not to be construed as limited to the particular procedures specified therein. Also, the present invention applies to all bacteria having the combination of characteristics previously set forth irrespective of any additional characteristics which they may possess. Likewise, our invention is applicable to the fermentation of mashes containing any fermentable carbohydrate and to the use of any suitable nutrients or neutralizing agents other than, or in addition to, those specifically or generally set forth above. The fermentation procedure may be modified in any respect as long as suitable nutrients are provided and temperature and pH conditions are maintained throughout the fermentation within operative ranges for the particular bacteria employed. In general it may be said that the use of any equivalents or modifications of procedure which would naturally occur to one skilled in the art, is included within the scope of the present invention.

What we claim is:

1. A process for the production of lower aliphatic acid mixtures which comprises subjecting a fermentable nutrient sugar mash to the action Clostridium - saccharo - aceto - propionic-butyricum for a period not substantially in excess of seventy-two hours at a temperature of between about 28 and 35° C. and at a pH of from about 5.0 to 7.0.

2. A process for the production of lower aliphatic acid mixtures which comprises subjecting a fermentable nutrient sugar mash to the action Clostridium - saccharo - aceto - propionic-butyricum for a period of from about forty-five to about seventy-two hours at a temperature of between about 30 and 32° C. and at a pH of from about 5.0 to 5.9.

3. A process for the production acetic, propionic, and butyric acids, which comprises subjecting a mash containing sucrose as the principal carbohydrate source and an ammonium compound as the principal source of nitrogenous nutrient to the action of Clostridium-saccharo-aceto-propionic-butyricum, and providing calcium carbonate in the mash in a concentration sufficient to maintain the pH of said mash within the range of from about 5.0 to 7.0 during the fermentation.

4. A process for the production of acetic, propionic, and butyric acids, which comprises subjecting a molasses mash containing as the principal source of nitrogenous nutrient an ammonium compound to the action of Clostridium-saccharo-aceto-propionic-butyricum, and providing a neutralizing agent in the mash which forms a substantially insoluble salt with said acids in a concentration sufficient to maintain the pH of said mash within the range of from about 5.0 to 7.0 during the fermenation.

5. The process of claim 3 in which the pH is maintained within the range of 5.0 to 5.9

6. The process of claim 4 in which the pH is maintained within range of 5.0 to 5.9.

7. The process of claim 4 in which the neutralizing agent is calcium carbonate and the pH of the mash is maintained within the range of 5.0 to 5.9.

8. A process for the production of acetic, propionic and butyric acids, which comprises subjecting a molasses mash containing mono-ammonium phosphate as the principal source of nitrogenous nutrient to the action of Clostridium-saccharo-aceto-propionic-butyricum, and providing sufficient calcium carbonate during the fermentation to maintain the pH of the mash within the range of from about 5.0 to 5.9 throughout said fermentation.

9. In a process for the production of lower aliphatic acid mixtures, the step which comprises subjecting a fermentable nutrient sugar mash to the action of Clostridium-saccharo-aceto-propionic-butyricum at a temperature of between about 28° and 35° C. and at a pH of from about 5.0 to 7.0

SAMUEL C. BEESCH.
DAVID A. LEGG.

REFERENCES CITED

The following references are of record in the file of this patent:

UNITED STATES PATENTS

| Number | Name | Date |
| --- | --- | --- |
| 1,400,852 | Backhaus | Dec. 20, 1921 |
| 1,725,083 | Izsak | Aug. 20, 1929 |
| 1,908,361 | Izsak et al. | May 9, 1933 |
| 1,913,346 | Stiles | June 6, 1933 |
| 2,181,311 | Arroyo | Nov. 28, 1939 |
| 2,417,801 | Weizmann | Mar. 18, 1947 |

FOREIGN PATENTS

| Number | Country | Date |
| --- | --- | --- |
| 17,776 | Great Britain | of 1914 |